United States Patent [19]

Weiler

[11] 4,261,686

[45] Apr. 14, 1981

[54] VARIABLE FLOW DIVIDER FOR TURBOMACHINES

[75] Inventor: Wolfgang Weiler, Dachau, Fed. Rep. of Germany

[73] Assignee: MTU Motoren-und Turbinen-Union Muenchen GmbH, Munich, Fed. Rep. of Germany

[21] Appl. No.: 65,100

[22] Filed: Aug. 9, 1979

[30] Foreign Application Priority Data

Aug. 9, 1978 [DE] Fed. Rep. of Germany ....... 2834860

[51] Int. Cl.³ ...................... F01B 25/02; F04D 29/44; F04D 29/56
[52] U.S. Cl. .................................. 415/151; 60/226 R
[58] Field of Search .............. 415/151, 159, 163, 145, 415/130; 60/226 R, 39.08, 39.36, 226 A, 226 B; 416/154, 156, 193 R; 239/265.11, 265.19, 265.37, 265.39

[56] References Cited

U.S. PATENT DOCUMENTS

| | | |
|---|---|---|
| 3,224,194 | 12/1965 | De Feo et al. ................... 415/151 X |
| 3,638,862 | 2/1972 | Wildner ............................ 239/265.39 |
| 3,924,404 | 12/1975 | Pollert ................................ 60/226 R |
| 3,988,889 | 11/1976 | Chamay et al. ...................... 60/226A |

*Primary Examiner*—Stanley N. Gilreath
*Attorney, Agent, or Firm*—Schwartz, Jeffery, Schwaab, Mack, Blumenthal & Koch

[57] ABSTRACT

Disclosed is a variable flow divider for a turbomachine having a gas flow channel, comprising a stationary annular casing member located within the exhaust gas flow channel of the turbomachine, thereby defining an inner flow duct and an outer, annular flow duct; a plurality of flaps pivotally mounted in the flow channel on a stationary portion of the turbomachine, including a plurality of primary flaps and a plurality of secondary flaps adapted for rotation with the primary flaps, each of these flaps rotating about an axis which is arranged at a right angle to the central axis of the turbomachine; and means, located substantially entirely within the annular casing, for rotating said flaps to vary the respective sizes of said inner and outer flow ducts in relation to one another.

9 Claims, 2 Drawing Figures

VARIABLE FLOW DIVIDER FOR TURBOMACHINES

BACKGROUND OF THE INVENTION

The present invention relates to a variable flow divider for turbomachines, and more particularly for turbojet engines, consisting of several flaps arranged on a stationary casing section for pivotal movement about axes of rotation extending at right angles to the center axis of the engine.

Variable-cycle jet engines are characterized by the fact that their thrust and consumption characteristics can be varied within a certain range. This variation in engine characteristics is achieved by varying the mass flows within the engine, which is accomplished in part by adjustment of variable compressor and turbine guide vane cascades and in part also by admitting or interrupting streams of air, for example, compressor bleed air tapped when needed to cool the afterburner.

What all such engines have in common, however, is the selective division of the air mass flow downstream of the low-pressure compressor into a core stream and a bypass stream by means of a variable flow divider. For this purpose, the flow divider is preferably arranged in the area of the intermediate compressor casing for two-spool engines and in the area of the intermediate-pressure compressor for three-spool engines.

It is by no means an easy technical task, however, to design the flow divider plus its actuating mechanism and/or to arrange these components between the core stream duct and the bypass stream duct of the engine such that, if at all possible, the outer diameter of the engine will not be increased over that of an equivalent, fixed-cycle engine and that no additional hardware affecting the flows in the core and bypass ducts will be required.

SUMMARY OF THE INVENTION

A broad object of the present invention is to eliminate the aforesaid difficulties and to provide a flow divider plus actuating means which can be accommodated in maximally flat and aerodynamically favorable construction between a first and a second, coaxially extending flow ducts, preferably between the core duct and the bypass duct of the engine.

It is a further object of the present invention to provide an actuating mechanism of the flow divider which requires a minimum of actuating effort.

Still another object of the present invention resides in providing a flow divider plus actuating means having a relatively low weight.

It is also an object of the present invention to provide an improved flow divider wherein the air mass flow is divided with maximum axial symmetry and uniformity, and proper sealing is achieved between the core duct and the bypass duct when the flow divider flaps are in their shutoff position.

It is a particular object of the present invention to provide a flow divider which represents a formation of flaps comprised of primary flaps and, arranged for pivotal movement together therewith, secondary flaps, where the actuating means are essentially arranged within a stationary casing annulus lying between an inner and an outer annular flow duct of the engine.

In accomplishing the foregoing objects, there has been provided in accordance with the present invention a variable flow divider for a turbomachine, particularly a turbojet engine, having a gas flow channel, comprising a stationary annular casing member located within the exhaust gas flow channel of the turbomachine, thereby defining an inner flow duct and an outer, annular flow duct; a plurality of flaps pivotally mounted in the flow channel on a stationary portion of the turbomachine, including a plurality of primary flaps and a plurality of secondary flaps adapted for rotation with the primary flaps, each of these flaps rotating about an axis which is arranged at a right angle to the central axis of the turbomachine; and means, located substantially entirely within the annular casing, for rotating the flaps to vary the respective sizes of the inner and outer flow ducts in relation to one another. Preferably, the flap rotating means comprises a plurality of tie-rods, one tie-rod being hinged at a first end of each of said primary flaps at a point spaced radially from the axis of rotation of the flap, a plurality of bellcranks pivotally mounted within the annular casing member, each bellcrank having a first leg to which the second end of one of the tie-rods is connected and a second leg, an actuating ring rotatably mounted coaxially to the central axis of the turbomachine within the annular casing, the second leg of each of the bellcranks being hingedly connected to the actuating ring, and means for rotating the actuating ring. In a preferred embodiment, the actuating ring rotating means comprises at least two circumferentially equally spaced levers arranged within the annular casing and hingedly attached to the actuating ring and a radially directed shaft connected to the levers for transmitting thereto an amount of torque necessary to rotate the actuating ring.

In accordance with another aspect of the invention there has been provided a turbomachine comprising a gas flow channel and located with the gas flow channel a variable flow divider of the type described above.

Further objects, features and advantages of the present invention will become apparent from the following detailed description of preferred embodiments, when considered together with the attached figures of drawing.

DETAILED DESCRIPTION OF PREFERRED EMBODIMENTS

Figure 1:
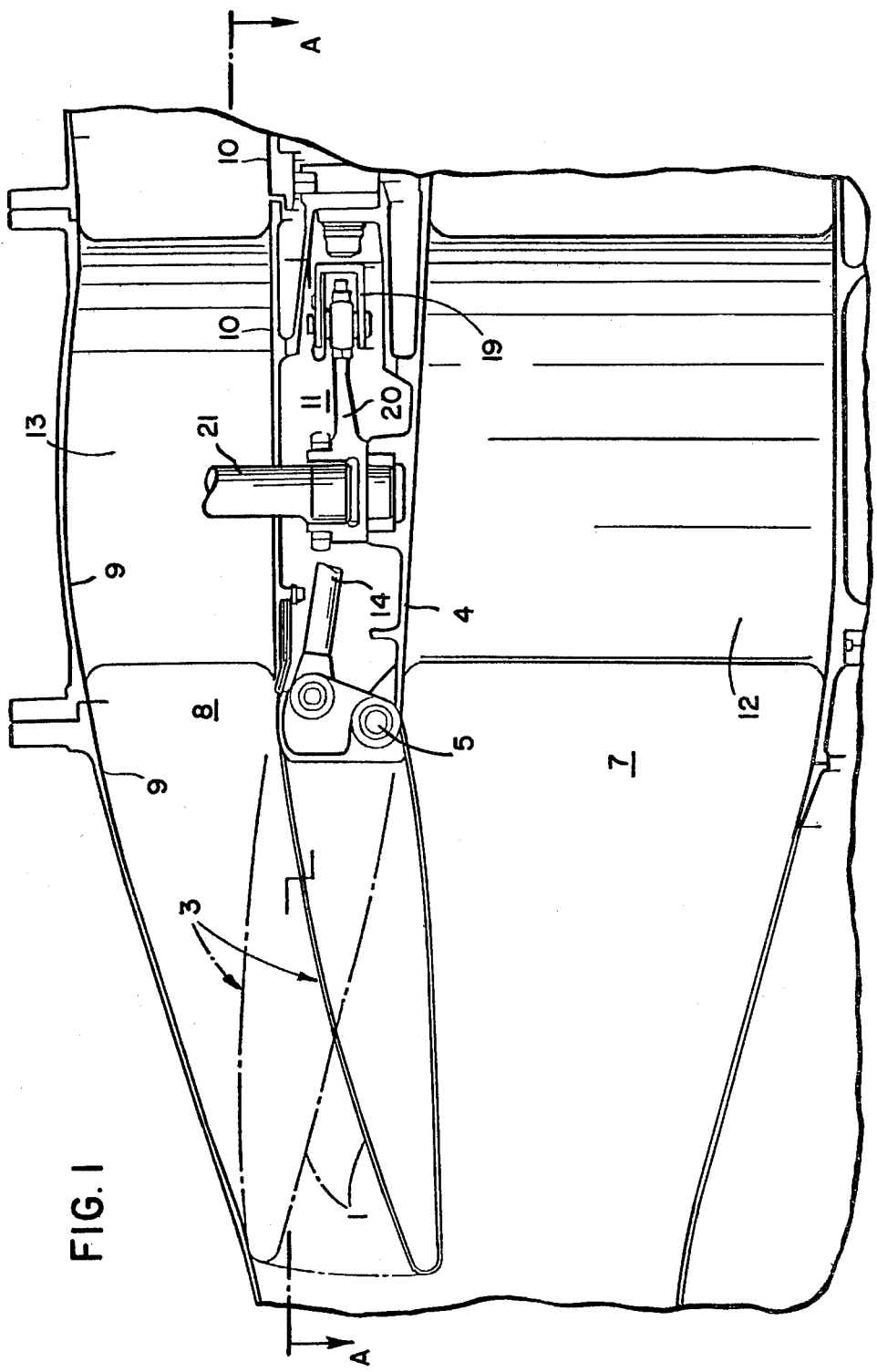
FIG. 1 is an elevation view illustrating an engine section fitted with a flow divider of the present invention.
Figure 2:
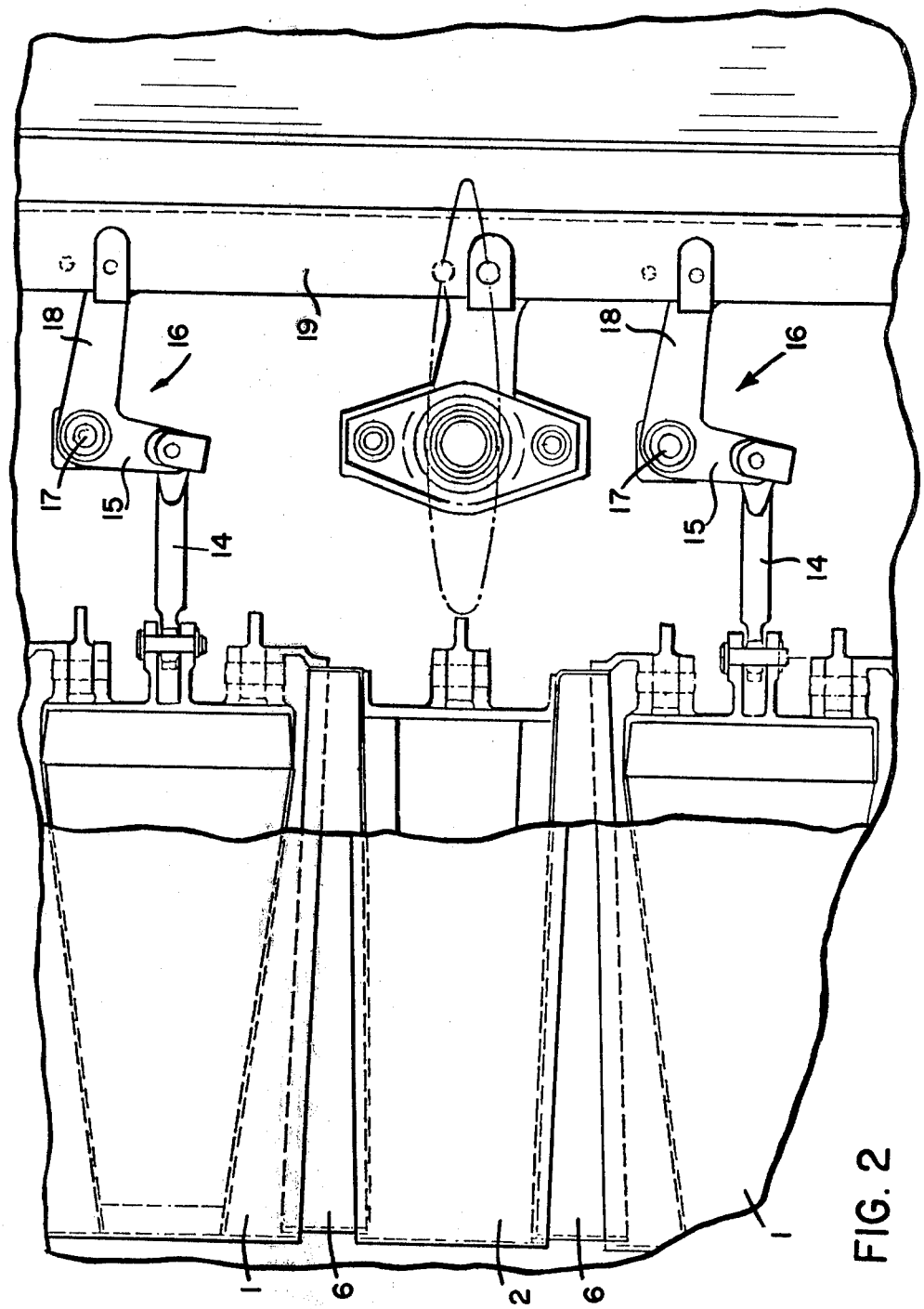
FIG. 2 is a plane-of-projection view taken along line A—A of FIG. 1.

FIGS. 1 and 2 illustrate the flow divider of the present invention on, e.g., a two-spool, variable-cycle engine, where the flow divider 3, essentially comprised of pivotally connected primary flaps 1 and secondary flaps 2, is arranged on the intermediate compressor casing 4, with the axis of rotation of a primary flap (FIG. 1) being indicated by the numeral 5. As is known from variable thrust nozzles of gas turbine engines, the primary and secondary flaps 1 and 2 are arranged in a circumferentially continuous formation of flaps, with a secondary flap 2 intervening between each two primary flaps 1 to be carried along and pivoted together with the primary flaps 1, when these are going through an actuating motion. The secondary flaps 2 have wedge-shaped flap sections 6, which in all positions of the flow divider 3 reach under the laterally adjacent surfaces of the primary flaps 1.

FIG. 1 also shows an inner annular duct for the flow of the core stream, indicated by the reference numeral 7, and an outer annular duct for the flow of the bypass stream, indicated by the reference numeral 8.

The flow divider 3 as here illustrated thus permits variable division of the air mass flow delivered by a low-pressure compressor (which is omitted on the drawings) into a core stream and a bypass stream, where the outer annular duct 8 for guiding the bypass stream may be closed off altogether if necessary, as it is illustrated in FIG. 1 by the dash-dotted line indicating an extreme position of a primary flap 1 of the flow divider. In this shutoff position, then, the upper faces of all primary and secondary flaps 1, 2 are abutting on the outer wall 9 of the duct.

The inner wall of the outer annular duct 8 in FIG. 1 is indicated by the numeral 10. The intermediate compressor casing 4 and the wall 10 of the inner duct follow the flow divider essentially in continuous alignment with the upper and lower wall portions of the primary and secondary flaps 1, 2, where the major portion of the actuating mechanism of the flow divider 3 is arranged within an annulus 11 enclosed by the duct wall 10 and the intermediate compressor casing 4.

The numerals 12 and 13 in FIG. 1 indicate the support or stay vanes which are arranged on either side of the annulus 11 in a common radial plane and extend through the annular ducts 7, 8.

For actuation of the flow divider 3, a tie-rod 14 is hinged to each primary flap 1 at a distance radially from the axis of rotation 5 of the flap, the tie-rod being hinged at its other end to a first leg 15 of a bellcrank 16, the fixed fulcrum 17 of which lies within the casing annulus 11 and the second leg 18 of which is hinged to an actuating ring 19 arranged coaxially to the engine center axis within the annulus. To this ring at least two circumferentially equally spaced levers 20 pivotally arranged within the annulus are hinged, and to these levers, the necessary actuating torque is transmitted via one radial shaft 21.

In one advantageous embodiment of the present invention, two such radial shafts 21 are provided which are arranged exactly opposite one another, with the respective lever fulcrums on the engine or on the intermediate casing 4, and which pass through the hollow support vanes 13. The two radial shafts 21 can be connected to a drive unit arranged outside the outer duct wall 9, or alternatively inside the outer annular duct 8.

The inventive concept applies equally to two-cycle or multiple-cycle jet engine configurations falling in the category of so-called variable configuration engines, whereby at least one flow divider designed in accordance with the present invention may be provided to ensure variable distribution of a stream of exhaust gas produced (e.g., a basic engine) to two or more mechanically independent turbines. In addition to a variable distribution of the exhaust gas flow, the flow divider of the present invention can be used also for completely interrupting the flow of gas to one turbine, which simultaneously makes available the entire exhaust gas stream for the purpose of exclusively energizing a second turbine adjacent to the first turbine.

The flow divider according to the present invention may be utilized in many types of turbomachines, for example, in a gas turbine engine of the type described in U.S. Pat. No. 4,147,026, the disclosure of which is hereby incorporated by reference.

What is claimed is:

1. A variable flow divider for a turbomachine having a gas flow channel, comprising:
    a stationary annular casing member located within the gas flow channel of the turbomachine, thereby defining an inner flow duct and an outer, annular flow duct;
    a plurality of flaps pivotally mounted in the flow channel on a stationary portion of the turbomachine, including a plurality of primary flaps and a plurality of secondary flaps adapted for rotation with said primary flaps, each of said flaps rotating about an axis which is arranged at a right angle to the central axis of the turbomachine; and
    means, located substantially entirely within said annular casing, for rotating said flaps to vary the respective sizes of said inner and outer flow ducts in relation to one another, wherein said flap rotating means comprises a plurality of tie-rods, one tie-rod being hinged at a first end of each of said primary flaps at a point spaced radially from the axis of rotation of the flap, a plurality of bellcranks pivotally mounted within said annular casing member, each bellcrank having a first leg to which the second end of one of said tie-rods is connected and a second leg, an actuating ring rotatably mounted coaxially to the central axis of the turbomachine within said annular casing, the second leg of each of said bellcranks being hingedly connected to said actuating ring, and means for rotating said actuating ring.

2. A flow divider as defined by claim 1, wherein said actuating ring rotating means comprises at least two circumferentially equally spaced levers arranged within said annular casing and hingedly attached to said actuating ring and a radially directed shaft connected to said levers for transmitting thereto an amount of torque necessary to rotate said actuating ring.

3. A flow divider as defined by claim 2, further comprising a hollow support vane mounted in the exhaust flow channel, and wherein said radial shaft passes through said hollow support vane and extends through said outer annular flow duct.

4. A flow divider as defined by claim 2, comprising two of said radial shafts, one connected to each of said levers.

5. A turbomachine comprising a gas flow channel and, positioned in said gas flow channel, a variable flow divider as defined by claim 1.

6. A variable flow divider for a turbomachine having a gas flow channel, comprising:
    a stationary annular casing member located within the gas flow channel of the turbomachine, thereby defining an inner flow duct and an outer, annular flow duct;
    a plurality of flaps extending generally along the axis of the turbomachine and being pivotally mounted in the flow channel on a stationary portion of the turbomachine to generally form an extension of said stationary annular casing member, including a plurality of primary flaps and a plurality of secondary flaps adapted for rotation with said primary flaps, each of said flaps rotating about an axis which extends transversely with respect to the flap near one end of the flap and which is arranged at a right angle with respect to the central axis of the turbomachine; and means, located substantially entirely within said annular casing, for rotating said flaps to simultaneously vary respective sizes of said inner and outer flow ducts in relation to one another, said flap rotating means comprising an actuating ring rotatably mounted coaxially to the central axis of the turbomachine within said annular casing, means for rotating said actuating ring about said central axis, and means interconnecting said actuating ring and each of said primary flaps for rotating said flaps in response to rotation of said actuating ring.

7. A flow divider as defined by claim 6, wherein said actuating ring rotating means comprises at least two circumferentially equally spaced levers arranged within said annular casing and hingedly attached to said actuating ring and a radially directed shaft connected to said levers for transmitting thereto an amount of torque necessary to rotate said actuating ring.

8. A flow divider as defined by claim 7, further comprising a hollow support vane mounted in the exhaust flow channel, and wherein said radial shaft passes through said hollow support vane and extends through said outer annular flow duct.

9. A flow divider as defined by claim 7, comprising two of said radial shafts, one connected to each of said levers.

* * * * *